United States Patent [19]
Breton et al.

[11] Patent Number: 5,389,134
[45] Date of Patent: Feb. 14, 1995

[54] INK COMPOSITIONS FOR INK JET PRINTING

[75] Inventors: Marcel P. Breton, Mississauga; Bärbel McGibbon, Oakville; H. Bruce Goodbrand, Hamilton, all of Canada

[73] Assignee: Xerox Corporation, Stamford, Conn.

[21] Appl. No.: 276,592

[22] Filed: Jul. 18, 1994

[51] Int. Cl.⁶ ............................................ C09D 11/02
[52] U.S. Cl. .................................. 106/22 H; 106/20 D
[58] Field of Search ..................... 106/22 H, 20 D

[56] References Cited

U.S. PATENT DOCUMENTS

| | | | |
|---|---|---|---|
| 4,308,061 | 12/1981 | Iwahashi et al. | 106/22 H |
| 4,314,086 | 2/1982 | Soula et al. | 568/652 |
| 4,348,520 | 9/1982 | Bruls et al. | 544/201 |
| 4,408,075 | 10/1983 | Soula et al. | 564/474 |
| 4,417,048 | 11/1983 | Soula et al. | 544/38 |
| 4,560,814 | 12/1985 | Soula et al. | 570/144 |
| 5,129,948 | 7/1992 | Breton et al. | 106/22 H |
| 5,173,112 | 12/1992 | Matrick et al. | 106/22 H |
| 5,250,109 | 10/1993 | Chan et al. | 106/22 H |
| 5,300,143 | 4/1994 | Schwartz, Jr. | 106/22 H |
| 5,302,197 | 4/1992 | Wickramanayke et al. | 106/22 H |

FOREIGN PATENT DOCUMENTS 124670  7/1985  Japan .................. 106/22 H

*Primary Examiner*—Helene Klemanski
*Attorney, Agent, or Firm*—Judith L. Byorick

[57] ABSTRACT

Disclosed is an ink composition which comprises water, a colorant, and a compound of the formula

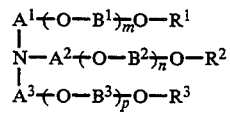

wherein $A^1$, $A^2$, $A^3$, $B^1$, $B^2$, and $B^3$ each, independently of each other, are linear alkenyl groups, $A^1$, $A^2$, $A^3$, $B^1$, $B^2$, and $B^3$ each, independently of each other, are either unsubstituted or substituted with alkyl groups, m, n, and p each, independently of each other, are integers of from 0 to about 10, and $R^1$, $R^2$, and $R^3$ each, independently of each other, are hydrogen, alkyl groups, cycloalkyl groups, phenyl groups, or alkylphenyl groups.

17 Claims, 3 Drawing Sheets

INK COMPOSITIONS FOR INK JET PRINTING

BACKGROUND OF THE INVENTION

The present invention is directed to aqueous ink compositions. More specifically, the present invention is directed to aqueous ink compositions particularly suitable for use in ink jet printing processes. One embodiment of the present invention is directed to an ink composition which comprises water, a colorant, and a compound of the formula

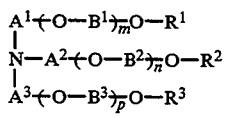

wherein $A^1$, $A^2$, $A^3$, $B^1$, $B^2$, and $B^3$ each, independently of each other, are linear alkenyl groups, $A^1$, $A^2$, $A^3$, $B^1$, $B^2$, and $B^3$ each, independently of each other, are either unsubstituted or substituted with alkyl groups, m, n, and p each, independently of each other, are integers of from 0 to about 10, and $R^1$, $R^2$, and $R^3$ each, independently of each other, are hydrogen, alkyl groups, cycloalkyl groups, phenyl groups, or alkylphenyl groups.

Ink jet printing systems generally are of two types: continuous stream and drop-on-demand. In continuous stream ink jet systems, ink is emitted in a continuous stream under pressure through at least one orifice or nozzle. The stream is perturbed, causing it to break up into droplets at a fixed distance from the orifice. At the break-up point, the droplets are charged in accordance with digital data signals and passed through an electrostatic field which adjusts the trajectory of each droplet in order to direct it to a gutter for recirculation or a specific location on a recording medium. In drop-on-demand systems, a droplet is expelled from an orifice directly to a position on a recording medium in accordance with digital data signals. A droplet is not formed or expelled unless it is to be placed on the recording medium.

Since drop-on-demand systems require no ink recovery, charging, or deflection, the system is much simpler than the continuous stream type. There are two types of drop-on-demand ink jet systems. One type of drop-on-demand system has as its major components an ink filled channel or passageway having a nozzle on one end and a piezoelectric transducer near the other end to produce pressure pulses. The relatively large size of the transducer prevents close spacing of the nozzles, and physical limitations of the transducer result in low ink drop velocity. Low drop velocity seriously diminishes tolerances for drop velocity variation and directionality, thus impacting the system's ability to produce high quality copies. Drop-on-demand systems which use piezoelectric devices to expel the droplets also suffer the disadvantage of a slow printing speed.

The other type of drop-on-demand system is known as thermal ink jet, or bubble jet, and produces high velocity droplets and allows very close spacing of nozzles. The major components of this type of drop-on-demand system are an ink filled channel having a nozzle on one end and a heat generating resistor near the nozzle. Printing signals representing digital information originate an electric current pulse in a resistive layer within each ink passageway near the orifice or nozzle, causing the ink in the immediate vicinity to evaporate almost instantaneously and create a bubble. The ink at the orifice is forced out as a propelled droplet as the bubble expands. When the hydrodynamic motion of the ink stops, the process is ready to start all over again. With the introduction of a droplet ejection system based upon thermally generated bubbles, commonly referred to as the "bubble jet" system, the drop-on-demand ink jet printers provide simpler, lower cost devices than their continuous stream counterparts, and yet have substantially the same high speed printing capability.

The operating sequence of the bubble jet system begins with a current pulse through the resistive layer in the ink filled channel, the resistive layer being in close proximity to the orifice or nozzle for that channel. Heat is transferred from the resistor to the ink. The ink becomes superheated far above its normal boiling point, and for water based ink, finally reaches the critical temperature for bubble formation or nucleation of around 280° C. Once nucleated, the bubble or water vapor thermally isolates the ink from the heater and no further heat can be applied to the ink. This bubble expands until all the heat stored in the ink in excess of the normal boiling point diffuses away or is used to convert liquid to vapor, which removes heat due to heat of vaporization. The expansion of the bubble forces a droplet of ink out of the nozzle, and once the excess heat is removed, the bubble collapses on the resistor. At this point, the resistor is no longer being heated because the current pulse has passed and, concurrently with the bubble collapse, the droplet is propelled at a high rate of speed in a direction towards a recording medium. The resistive layer encounters a severe cavitational force by the collapse of the bubble, which tends to erode it. Subsequently, the ink channel refills by capillary action. This entire bubble formation and collapse sequence occurs in about 10 microseconds. The channel can be retired after 100 to 500 microseconds minimum dwell time to enable the channel to be refilled and to enable the dynamic refilling factors to become somewhat dampened. Thermal ink jet processes are well known and are described in, for example, U.S. Pat. Nos. 4,601,777, 4,251,824, 4,410,899, 4,412,224, and 4,532,530, the disclosures of each of which are totally incorporated herein by reference.

U.S. Pat. No. 4,314,086 (Soula et al.), the disclosure of which is totally incorporated herein by reference, discloses aliphatic/aromatic ethers prepared by reacting an aliphatic halide with either an alkali or alkaline earth metal, or ammonium phenolate or naphtholate, in an inert organic solvent, and in the presence of at least one tertiary amine sequestering agent having the formula $N[CHR_1CHR_2-O-CHR_3-(CHR_4-O-)_nR_5]_3$.

U.S. Pat. No. 4,417,048 (Soula et al.), the disclosure of which is totally incorporated herein by reference, discloses organonitrogen compounds bearing a labile hydrogen atom directly bonded to a reactive nitrogen function, e.g., nitrogen heterocycles or substituted anilines, which are N-alkylated with an N-alkylating agent in the presence of inorganic base and at least one sequestering agent having the structural formula $N[[CHR_1CHR_2-O-CHR_3-(CHR_4-O-)_nR_5]_3$, wherein n is a number ranging from 0 to 10, $R_1$, $R_2$, $R_3$, and $R_4$, which may be identical or different, each represent a hydrogen atom or an alkyl radical having 1 to 4 carbon atoms, and $R_5$ represents an alkyl or cycloalkyl radical having 1 to 12 carbon atoms, a phenyl radical, or a radical of the formula $-C_mH_{2m}-\Phi$ or $C_mH_{2m+1}$—Φ—, m ranging from 1 to about 12 and Φ being phenyl.

U.S. Pat. No. 4,408,075 (Soula et al.), the disclosure of which is totally incorporated herein by reference, discloses a process of preparing tris-(ether-amines) of the formula N[A—O—(B—O)$_n$—R]$_3$ in which R represents a hydrocarbon radical, A and B represent alkanediyl radicals, and n is a whole number between zero and 4, by ammonolysis of an alkylene glycol mono-ether of the formula HO—A—O—(B—O)$_n$—R in the presence of 10 to 40 percent by weight of a hydrogenation-dehydrogenation catalyst, based on weight of said alkylene glycol monoether.

U.S. Pat. No. 4,560,814 (Soula), the disclosure of which is totally incorporated herein by reference, discloses a process for alkylating halogenated and trifluoromethylated benzene compounds. An alkyl halide is reacted with a benzene compound having two or three substituents selected from the group consisting of the halogens and the trifluoromethyl group, and also having a hydrogen atom whose two ortho positions are occupied by two of the said substituents. The reaction is carried out in the presence of at least one alkali metal amide and at least one agent that complexes with the cation of the alkali metal amide.

U.S. Pat. No. 4,348,520 (Bruls et al.), the disclosure of which is totally incorporated herein by reference, discloses an improved method for the preparation of melamine by the conversion of urea and/or thermal decomposition products thereof. The urea and/or thermal decomposition products are converted to melamine in the presence of a gas mixture containing ammonia and carbon dioxide in a reaction zone containing a fluidized bed of catalytically active material. Melamine is desublimated from the melamine containing gas mixture in a desublimation zone by a dry-capture method leaving a desublimator off-gas mixture of ammonia, carbon dioxide, and gaseous impurities. A major portion of this desublimator off-gas mixture is compressed and recirculated to the reaction zone as a fluidizing gas for the bed of catalytically active material, without intervening treatment to remove gaseous impurities from the desublimator off-gas.

While known compositions and processes are suitable for their intended purposes, a need remains for ink compositions suitable for thermal ink jet printing. In addition, there is a need for aqueous ink compositions which enable the use of dyes which exhibit low solubility in water. Further, there is a need for ink compositions which, when employed in thermal ink jet printing processes, exhibit reduced kogation. Additionally, there is a need for ink compositions in which the effect of any monovalent or divalent cations present in the ink is minimized.

SUMMARY OF THE INVENTION

It is an object of the present invention to provide an ink composition with the above noted advantages.

It is another object of the present invention to provide ink compositions suitable for thermal ink jet printing.

It is yet another object of the present invention to provide aqueous ink compositions which enable the use of dyes which exhibit low solubility in water.

It is still another object of the present invention to provide ink compositions which, when employed in thermal ink jet printing processes, exhibit reduced kogation.

Another object of the present invention is to provide ink compositions in which the effect of any monovalent or divalent cations present in the ink is minimized.

These and other objects of the present invention (or specific embodiments thereof) can be achieved by providing an ink composition which comprises water, a colorant, and a compound of the formula

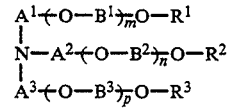

wherein $A^1$, $A^2$, $A^3$, $B^1$, $B^2$, and $B^3$ each, independently of each other, are linear alkenyl groups, $A^1$, $A^2$, $A^3$, $B^1$, $B^2$, and $B^3$ each, independently of each other, are either unsubstituted or substituted with alkyl groups, m, n, and p each, independently of each other, are integers of from 0 to about 10, and $R^1$, $R^2$, and $R^3$ each, independently of each other, are hydrogen, alkyl groups, cycloalkyl groups, phenyl groups, or alkylphenyl groups.

DETAILED DESCRIPTION OF THE INVENTION

Figure 1:
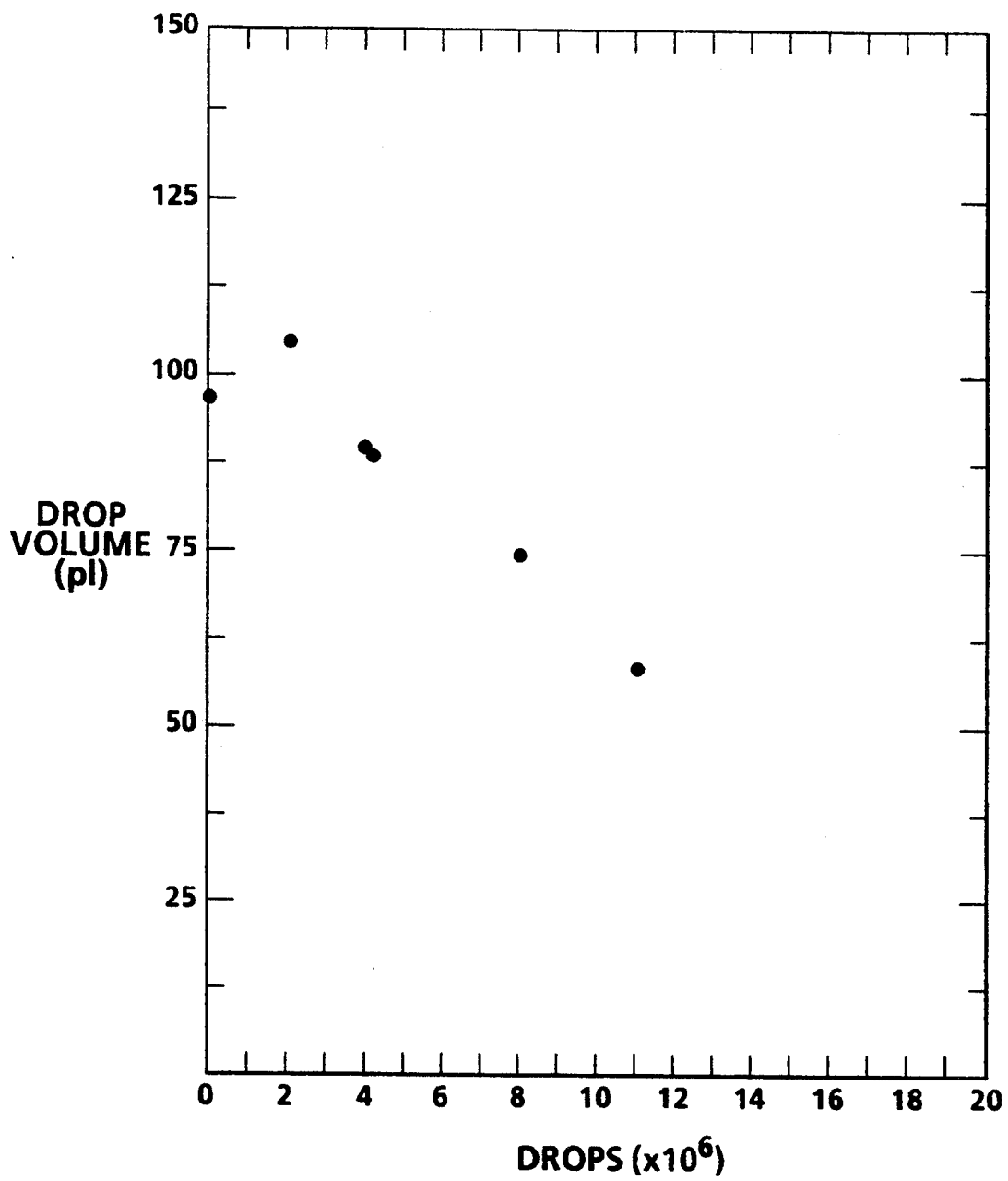
FIGS. 1 and 2 show the decrease in drop volume with respect to the number of drops ejected of a printhead.

The ink compositions of the present invention comprise an aqueous liquid vehicle. The liquid vehicle can consist solely of water, or it can comprise a mixture of water and a water soluble or water miscible organic component, such as ethylene glycol, propylene glycol, diethylene glycol, glycerine, dipropylene glycol, polyethylene glycols, polypropylene glycols, amides, ethers, carboxylic acids and their salts, esters, alcohols, organosulfides, organosulfoxides, sulfones, alcohol derivatives, hydroxyether derivatives such as butyl carbitol or cellusolve, amino alcohols, ketones, polyelectrolytes, and other water soluble or water miscible materials, as well as mixtures thereof. When mixtures of water and water soluble or miscible organic liquids are selected as the liquid vehicle, the water to organic ratio typically ranges from about 100:0 to about 40:60, and preferably from about 97:3 to about 50:50. The non-water component of the liquid vehicle generally serves as a humectant which has a boiling point higher than that of water (100° C.). In the ink compositions for the present invention, the liquid vehicle is typically present in an amount of from about 80 to about 99.9 percent by weight of the ink, and preferably from about 90 to about 99 percent by weight of the ink, although the amount can be outside these ranges.

The ink composition also contains a colorant. Any suitable dye or pigment compatible with the ink liquid vehicle can be used. Examples of suitable dyes include Food dyes such as Food Black No. 2, Food Red No. 40, Food Blue No. 1, Food Yellow No. 7, and the like, FD&C dyes, anthraquinones, monoazo dyes, disazo dyes, phthalocyanines, aza[18]annulenes, formazan copper complexes, triphenodioxazines, Bernacid Red 2BMN; Pontamine Brilliant Bond Blue A; Food Black 2; Carodirect Turquoise FBL Supra Conc. (Direct Blue 199) (Carolina Color and Chemical); Special Fast Turquoise 8GL Liquid (Direct Blue 86) (Mobay Chemical); Intrabond Liquid Turquoise GLL (Direct Blue 86) (Crompton and Knowles); Cibracron Brilliant Red 38-A (Reactive Red 4) (Aldrich Chemical); Drimarene Brilliant Red X-2B (Reactive Red 56) (Pylam, Inc.); Levafix Brilliant Red E-4B (Mobay Chemical); Levafix Brilliant Red E-6BA (Mobay Chemical); Procion Red H8B (Reactive Red 31) (ICI America); Pylam Certified D&C Red #28 (Acid Red 92) (Pylam); Direct Brill Pink 13 Ground Crude (Crompton & Knowles); Cartasol Yellow GTF Presscake (Sandoz, Inc.); Tartrazine Extra Conc. (FD&C Yellow #5, Acid Yellow 23) (Sandoz); Carodirect Yellow RL (Direct Yellow 86) (Carolina Color and Chemical); Cartasol Yellow GTF Liquid Special 110 (Sandoz, Inc.); D&C Yellow #10 (Acid Yellow 3) (Tricon); Yellow Shade 16948 (Tricon), Basacid Black X34 (BASF), Carta Black 2GT (Sandoz, Inc.); Neozapon Red 492 (BASF); Orasol Red G (Ciba-Geigy); Direct Brilliant Pink B (Crompton-Knolls); Aizen Spilon Red C-BH (Hodogaya Chemical Company); Kayanol Red 3BL (Nippon Kayaku Company); Levanol Brilliant Red 3BW (Mobay Chemical Company); Levaderm Lemon Yellow (Mobay Chemical Company); Spirit Fast Yellow 3G; Aizen Spilon Yellow C-GNH (Hodogaya Chemical Company); Sirius Supra Yellow GD 167; Cartasol Brilliant Yellow 4GF (Sandoz); Pergasol Yellow CGP (Ciba-Geigy); Orasol Black RL (Ciba-Geigy); Orasol Black RLP (Ciba-Geigy); Savinyl Black RLS (Sandoz); Dermacarbon 2GT (Sandoz); Pyrazol Black BG (ICI); Morfast Black Conc A (Morton-Thiokol); Diazol Black RN Quad (ICI); Orasol Blue GN (Ciba-Geigy); Savinyl Blue GLS (Sandoz); Luxol Blue MBSN (Morton-Thiokol); Sevron Blue 5GMF (ICI); Basacid Blue 750 (BASF); Bernacid Red (Berncolors, Poughkeepsie, N.Y.); Pontamine Brilliant Bond Blue; Berncolor A.Y. 34; Telon Fast Yellow 4GL-175; BASF Basacid Black SE 0228; the Pro-Jet series of dyes available from ICI, including Pro-Jet Yellow I (Direct Yellow 86), Pro-Jet Magenta I (Acid Red 249), Pro-Jet Cyan I (Direct Blue 199), Pro-Jet Black I (Direct Black 168), Pro-Jet Yellow 1-G (Direct Yellow 132), Aminyl Brilliant Red F-B, available from Sumitomo Chemical Company (Japan), the Duasyn line of "salt-free" dyes available from Hoechst, such as Duasyn Direct Black HEF-SF (Direct Black 168), Duasyn Black RL-SF (Reactive Black 31), Duasyn Direct Yellow 6G-SF VP216 (Direct Yellow 157), Duasyn Brilliant Yellow GL-SF VP220 (Reactive Yellow 37), Duasyn Acid Yellow XX-SF LP413 (Acid Yellow 23), Duasyn Brilliant Red F3B-SF VP218 (Reactive Red 180), Duasyn Rhodamine B-SF VP353 (Acid Red 52), Duasyn Direct Turquoise Blue FRL-SF VP368 (Direct Blue 199), Duasyn Acid Blue AE-SF VP344 (Acid Blue 9), and the like, as well as mixtures thereof. When the colorant is a dye, the dye is present in the ink composition in any effective amount, typically from about 0.5 to about 15 percent by weight, and preferably from about 3 to about 6 percent by weight, although the amount can be outside of these ranges.

Examples of suitable pigments include various carbon blacks such as channel black, furnace black, lamp black, Raven 5250, Raven 5750, Raven 3500 and other similar carbon black products available from Columbia Company, Regal ®330, Black Pearl L, Black Pearl 1300, and other similar carbon black products available from Cabot Company, Degussa carbon blacks such as Derussol carbon black dispersions available from Degussa Company, and the like. Other suitable pigments include Normandy Magenta RD-2400 (Paul Uhlich), Paliogen Violet 5100 (BASF), Paliogen Violet 5890 (BASF), Permanent Violet VT2645 (Paul Uhlich), Heliogen Green L8730 (BASF), Argyle Green XP-111-S (Paul Uhlich), Brilliant Green Toner GR 0991 (Paul Uhlich), Heliogen Blue L6900, L7020 (BASF), Heliogen Blue D6840, D7080 (BASF), Sudan Blue OS (BASF), PV Fast Blue B2G01 (American Hoechst), Irgalite Blue BCA (Ciba-Geigy), Paliogen Blue 6470 (BASF), Sudan III (Matheson, Coleman, Bell), Sudan II (Matheson, Coleman, Bell), Sudan IV (Matheson, Coleman, Bell), Sud an Orange G (Aldrich), Sudan Orange 220 (BASF), Paliogen Orange 3040 (BASF), Ortho Orange OR 2673 (Paul Uhlich), Paliogen Yellow 152, 1560 (BASF), Lithol Fast Yellow 0991K (BASF), Paliotol Yellow 1840 (BASF), Novoperm Yellow FG1 (Hoechst), Permanennt Yellow YE 0305 (Paul Uhlich), Lumogen Yellow D0790 (BASF), Suco-Gelb L1250 (BASF), Suco-Yellow D1355 (BASF), Hostaperm Pink E (American Hoechst), Fanal Pink D4830 (BASF), Cinquasia Magenta (DuPont), Lithol Scarlet D3700 (BASF), Toluidine Red (Aldrich), Scarlet for Thermoplast NSD PS PA (Ugine Kuhlmann of Canada), E. D. Toluidine Red (Aldrich), Lithol Rubine Toner (Paul Uhlich), Lithol Scarlet 4440 (BASF), Bon Red C (Dominion Color Company), Royal Brilliant Red RD8192 (Paul Uhlich), Oracet Pink RF (Ciba-Geigy), Paliogen Red 3871K (BASF), Paliogen Red 3340 (BASF), and Lithol Fast Scarlet L4300 (BASF). Other pigments can also be selected. Particularly preferred pigment particles are nonmutagenic and nontoxic carbon black particles with a polyaromatic hydrocarbon content of less than about 1 part per million. When the colorant is a pigment, the pigment is present in any effective amount, typically from about 1 to about 12 percent by weight of the ink, preferably from about 3 to about 10 percent by weight of the ink, although the amount can be outside this range.

Mixtures of dyes and pigments can also be employed.

Also present in the ink are acyclic cryptands or tridents of the general formula

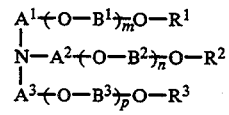

wherein $A^1$, $A^2$, $A^3$, $B^1$, $B^2$, and $B^3$ each, independently of each other, are linear alkenyl groups, preferably with from about 2 to about 3 carbon atoms, $A^1$, $A^2$, $A^3$, $B^1$, $B^2$, and $B^3$ each, independently of each other, are either unsubstituted or substituted with alkyl groups (the alkyl groups, if present, preferably having from 1 to about 4 carbon atoms), m, n, and p each, independently of each other, are integers of from 0 to about 10, and $R^1$, $R^2$, and $R^3$ each, independently of each other, are hydrogen, alkyl groups (preferably with from 1 to about 24 carbon atoms and more preferably from 1 to about 12 carbon atoms), cycloalkyl groups (preferably with from 1 to about 12 carbon atoms), phenyl groups, or alkylphenyl groups (preferably wherein the alkyl group contains from 1 to about 12 carbon atoms).

In a preferred embodiment,, the acyclic cryptands or tridents are of the general formula

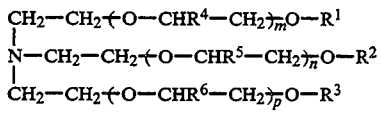

wherein $R^1$, $R^2$, and $R^3$ each, independently of each other, are hydrogen or alkyl groups with from 1 to about 4 carbon atoms, $R^4$, $R^5$, and $R^6$ each, independently of each other, are hydrogen or alkyl groups with 1 or 2 carbon atoms, and m, n, and p each, independently of each other, are integers of from 1 to about 5. One example of a preferred trident is tris[2-(2-methoxy-ethoxy)ethyl]amine. Tris[2-(2-methoxy-ethoxy)ethyl]amine, commercially available from Aldrich Chemical Co., Milwaukee, Wis. under the trade name TDA-1, is of the formula

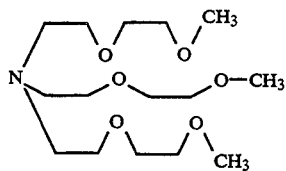

The acyclic cryptand or trident, which preferably is soluble or dispersible in the ink, is present in the ink in any effective amount, typically at least about 1 percent by weight or from about 1 to about 10 percent by weight, preferably at least about 3 percent by weight or from about 3 to about 6 percent by weight, and more preferably from about 3 to about 4 percent by weight, although the amount can be outside these ranges. Further information regarding acyclic cryptands or tridents of the above formulae and processes for the preparation thereof is disclosed in, for example, U.S. Pat. No. 2,285,419, U.S. Pat. No. 4,408,075, French Patent 1,302,365, French Patent 2,450,120, U.S. Pat. No. 4,417,048, U.S. Pat. No. 4,560,814, and U.S. Pat. No. 4,314,086, the disclosures of each of which are totally incorporated herein by reference.

While not being limited to any particular theory, it is believed that the acyclic cryptand or trident reduces kogation by complexing with monovalent and divalent cations which may be present in the ink and also by complexing with at least some of the more hydrophobic decomposition products of the dye which are formed when the dye in the ink is subjected to the high temperatures generated by the printhead heaters. For the same reason, the acyclic cryptand or trident enables the use of dyes having lower water solubility, which are often the cause of increased kogation. Accordingly, increased waterfastness can also be obtained with the inks of the present invention.

Other additives can also be present in the ink composition of the present invention. For example, one or more dispersing agents or surfactants or wetting agents may be added to the ink. These additives can be of the cationic, anionic, or nonionic types. Suitable surfactants, dispersing agents, and wetting agents include copolymers of naphthalene sulfonic acid salt and formaldehyde, including Daxad® 11, 11KLS, 19, 19K, and the like available from W. R. Grace & Company, the Lomar® D series available from Diamond Shamrock Corporation, vinyl aromatic salts available from Polyscience Company, Tamol® SN, Tamol® LG, the Triton® series available from Rohm and Haas Company, the Igepal® series available from GAF Company, the Tergitol® series, water compatible solvents such as ethylene glycol and the like, and other commercially available surfactants. These surfactants, dispersing agents, and wetting agents, if present, are present in any effective or desired amount, typically from about 0.01 to about 10 percent by weight of the ink, and preferably from about 0.01 to about 3 percent by weight of the ink, although the amount can be outside these ranges.

Polymeric additives can also be added to the inks of the present invention to enhance the viscosity of the ink composition. Water soluble polymers such as Gum Arabic, polyacrylate salts, polymethacrylate salts, polyvinyl alcohols, polyethylene oxides, poyethylene glycols, polypropylene glycols, hydroxy propylcellulose, hydroxyethylcellulose, polyvinylpyrrolidinone, polyvinylether, starch, polyacrylamide, lignin sulfonate salts, copolymers of naphthalene sulfonate salts and formaldehyde, polysaccharides, and the like are particularly useful for stabilizing pigment particles in a water based liquid vehicle such as water or a mixture of water and a water miscible organic liquid. Polymeric stabilizers, if present, can be present in the ink composition of the present invention in any effective amount, typically from about 0.1 to about 10 percent by weight of the ink, and preferably from about 0.5 to about 5 percent by weight of the ink, although the amount can be outside these ranges.

One example of an additive to the inks is a polymeric additive consisting of two polyalkylene oxide chains bound to a central bisphenol-A-type moiety. This additive is of the formula

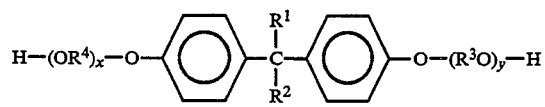

wherein $R^1$ and $R^2$ are independently selected from the group consisting of hydrogen, alkyl groups with from 1 to about 8 carbon atoms, such as methyl, ethyl, propyl, and the like, and alkoxy groups with from 1 to about 8 carbon atoms, such as methoxy, ethoxy, butoxy, and the like, $R^3$ and $R^4$ are independently selected from the group consisting of alkyl groups with from 1 to about 4 carbon atoms, and x and y are each independently a number of from about 100 to about 400, and preferably from about 100 to about 200. Generally, the molecular weight of the polyalkylene oxide polymer is from about 14,000 to about 22,000, and preferably from about 15,000 to about 20,000, although the molecular weight can be outside this range. Materials of this formula are commercially available; for example, Carbowax M20, a polyethylene oxide/bisphenol-A polymer of the above formula with a molecular weight of about 18,000, available from Union Carbide Corporation, Danbury, Conn., is a suitable polymeric additive for the inks of the present invention. In addition, compounds of the above formula can be prepared by the methods disclosed in *Polyethers*, N. G. Gaylord, John Wiley & Sons, N.Y. (1963) and "Laboratory Synthesis of Polyethylene Glycol Derivatives," J. M. Harris, *J. Molecular Science—Rev. Macromol. Chem. Phys.*, C25(3), 325–373 (1985), the disclosures of each of which are totally incorporated herein by reference. The polyalkylene oxide additive is generally present in the ink in an amount of at least about 1 part per million. Typically, the polyalkylene oxide additive is present in amounts of up to 1 percent by weight of the ink, and preferably in amounts of up to 0.5 percent by weight of the ink; larger amounts of the additive may increase the viscosity of the ink beyond the desired level, but larger amounts can be used in applications wherein increased ink viscosity is not a problem. Inks containing these additives are disclosed in U.S. Pat. No. 5,207,825, the disclosure of which is totally incorporated herein by reference.

Other optional additives to the ink composition of the present invention include biocides, such as Dowicil 150, 200, and 75, benzoate salts, sorbate salts, and the like, typically present in an amount of from about 0.0001 to about 4 percent by weight, and preferably from about 0.01 to about 2.0 percent by weight, although the amount can be outside these ranges, humectants, such as ethylene glycol, diethylene glycol, propylene glycol, N-methylpyrrolidinone, hydroxyethers, ethers, amides, cyclic amides, sulfones, sulfoxides, ketones, lactones, esters, alcohols, and the like, typically present in an amount of from 0 to about 70 percent by weight, and preferably from about 3 to about 40 percent by weight, although the amount can be outside these ranges, antioxidants, including derivatives of phenols such as BHT, 2,6-di-t-butylphenol, and the like, tocopherol derivatives such as Vitamin E and the like, aromatic amines, alkyl and aromatic sulfides, and the like, typically present in an amount of from 0 to about 10 percent by weight, and preferably from 0 to about 5 percent by weight, although the amount can be outside these ranges, pH controlling agents, including acids such as acetic acid, phosphoric acid, boric acid, sulfuric acid, nitric acid, hydrochloric acid, and the like, bases such as potassium hydroxide, sodium hydroxide, lithium hydroxide, ammonium hydroxide, trimethylamine, ethanolamine, morpholine, triethanolamine, diethanolamine, and the like, phosphate salts, carboxylate salts, sulfite salts, amine salts, and the like, typically present in an amount of from 0 to about 10 percent by weight, and preferably from about 0.001 to about 5 percent by weight, although the amount can be outside these ranges, drying accelerating agents, such as sodium lauryl sulfate, N,N-diethyl-m-toluamide, cyclohexylpyrrolidinone, butylcarbitol, and the like, typically present in an amount of from about 0.001 to about 5 percent by weight, and preferably from about 0.01 to about 3 percent by weight, although the amount can be outside these ranges, surface tension modifiers, such as sodium lauryl sulfate, sodium octyl sulfate, and the like, typically present in an amount of from 0 to about 10 percent by weight, and preferably from 0 to about 5 percent by weight, although the amount can be outside these ranges, ink penetrants, such as alcohols, sodium lauryl sulfate, esters, ketones, and the like, typically present in an amount of from about 0.001 to about 15 percent by weight, and preferably from about 0.001 to about 10 percent by weight, although the amount can be outside these ranges, and additives for improving waterfastness and lightfastness, such as polyethyleneimine, ethylene and propylene oxide modified polyethyleneimine, and the like, typically present in an amount of from 0 to about 10 percent by weight, and preferably from 0 to about 5 percent by weight, although the amount can be outside these ranges. The viscosity of the recording fluid typically is from about 1 to about 10 centipoise (measured at 25° C.) and preferably is less than about 3 centipoise, although the viscosity can be outside these ranges.

Inks of the present invention can be prepared by any process suitable for preparing aqueous-based inks. For example, the ink ingredients can be mixed in the desired amounts and stirred until a uniform ink composition results (typically about 30 minutes, although the mixing/stirring time can be either greater or less than this period). While not required, the ink ingredients can be heated during mixing if desired. Subsequent to mixing and stirring, the pH of the ink can be adjusted if desired or necessary. Finally, the ink composition generally is filtered to remove any solid or particulate matter, preferably removing any particles greater than about 0.8 micron in average particle diameter.

The process of the present invention can be employed with a wide variety of substrates, including plain papers such as Xerox ® 4024 papers, including Ashdown 4024 DP, Cortland 4024 DP, Champion 4024 DP, Xerox ® 4024 D.P. green, Xerox ® 4024 D.P. pink, Xerox ® 4024 D.P yellow, and the like, Xerox ® 4200 papers, Xerox ® 10 series paper, canary ruled paper, ruled notebook paper, bond paper such as Gilbert 25 percent cotton bond paper, Gilbert 100 percent cotton bond paper, and Strathmore bond paper, silica coated papers such as Sharp Company silica coated paper, JuJo paper, and the like, transparency materials such as Xerox ® 3R3351, Tetronix ink jet transparencies, Arkright ink jet transparencies, and the like, fabrics, textile products, plastics, polymeric films, inorganic substrates such as metals and wood, and the like.

Specific embodiments of the invention will now be described in detail. These examples are intended to be illustrative, and the invention is not limited to the materials, conditions, or process parameters set forth in these embodiments. All parts and percentages are by weight unless otherwise indicated.

EXAMPLE I (Control A)

An ink composition was prepared with the following contents by heating and stirring the ingredients for two hours at 50° C., followed by cooling to room temperature and filtering through a disposable 0.45 micron cellulose acetate filter (obtained from Nalga Co., Rochester, N.Y.): 2.5 percent by weight Direct Black 168 dye, Lot 1M0 (obtained from Hoechst, Willowdale, Ontario), 20.0 percent by weight ethylene glycol, 0.03 percent by weight of a polyethylene oxide/bisphenol-A polymer with a molecular Weight of 18,500, obtained from Polysciences, Warrington, Pa., and 77.47 percent by weight deionized water. The jetting performance of this ink was evaluated in a test fixture which monitors at specific intervals the drop volume generated by an ink jet printhead upon firing in excess of $10^7$ drops. A 40 percent drop volume loss was measured by $1 \times 10^7$ drops when the ink was tested at 3000 Hz and at 10 percent over the threshold voltage necessary for the drop to be ejected from the printhead. FIG. 1 shows the decrease in drop volume with respect to the number of drops ejected of a printhead. A reduction in drop volume of more than 10 percent over the lifetime of a printhead renders the printhead unacceptable for commercial use.

EXAMPLE II (Control B)

Figure 2:
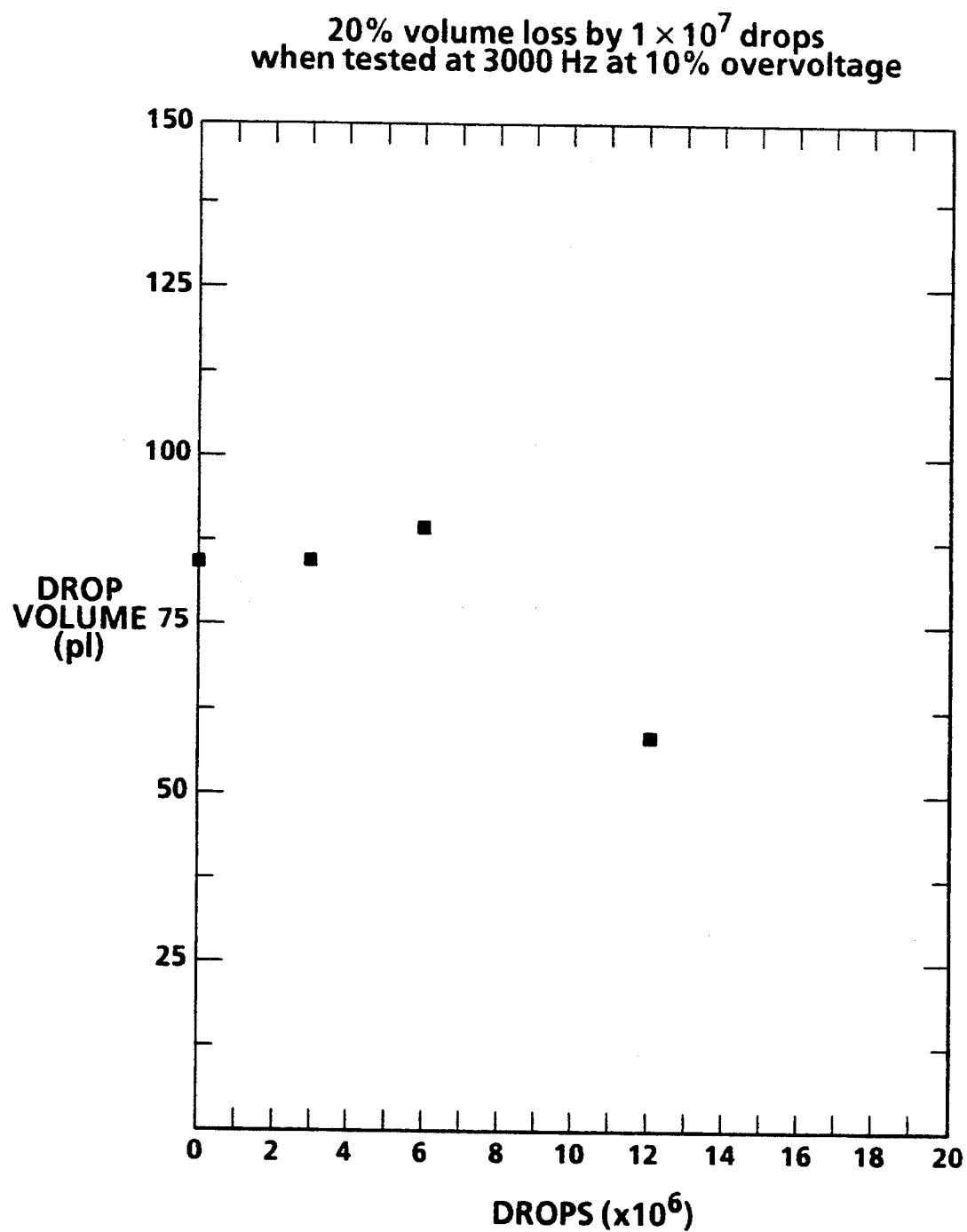

An ink composition was prepared with the following contents by heating and stirring the ingredients for two hours at 50° C. followed by cooling to room temperature and filtering through a disposable 0.45 micron cellulose acetate filter (obtained from Nalga Co., Rochester, N.Y.): 2.5 percent by weight Direct Black 168 dye, Lot DG-55 (obtained from Hoechst, Willowdale, Ontario), 20.0 percent by weight ethylene glycol, 0.03 percent by weight of a polyethylene oxide/bisphenol-A polymer with a molecular weight of 18,500, obtained from Polysciences, Warrington, Pa., and 77.47 percent by weight deionized water. The jetting performance of this ink was evaluated in a test fixture which monitors at specific intervals the drop volume generated by an ink jet printhead upon firing in excess of $10^7$ drops. A 20 percent drop volume loss was measured by $1 \times 10^7$ drops when the ink was tested at 3000 Hz and at 10 percent over the threshold voltage necessary for the drop to be ejected from the printhead. FIG. 2 shows the decrease in drop volume with respect to the number of drops ejected of a printhead. A reduction in drop volume of more than 10 percent over the lifetime of a printhead renders the printhead unacceptable for commercial use.

EXAMPLE III

Figure 3:
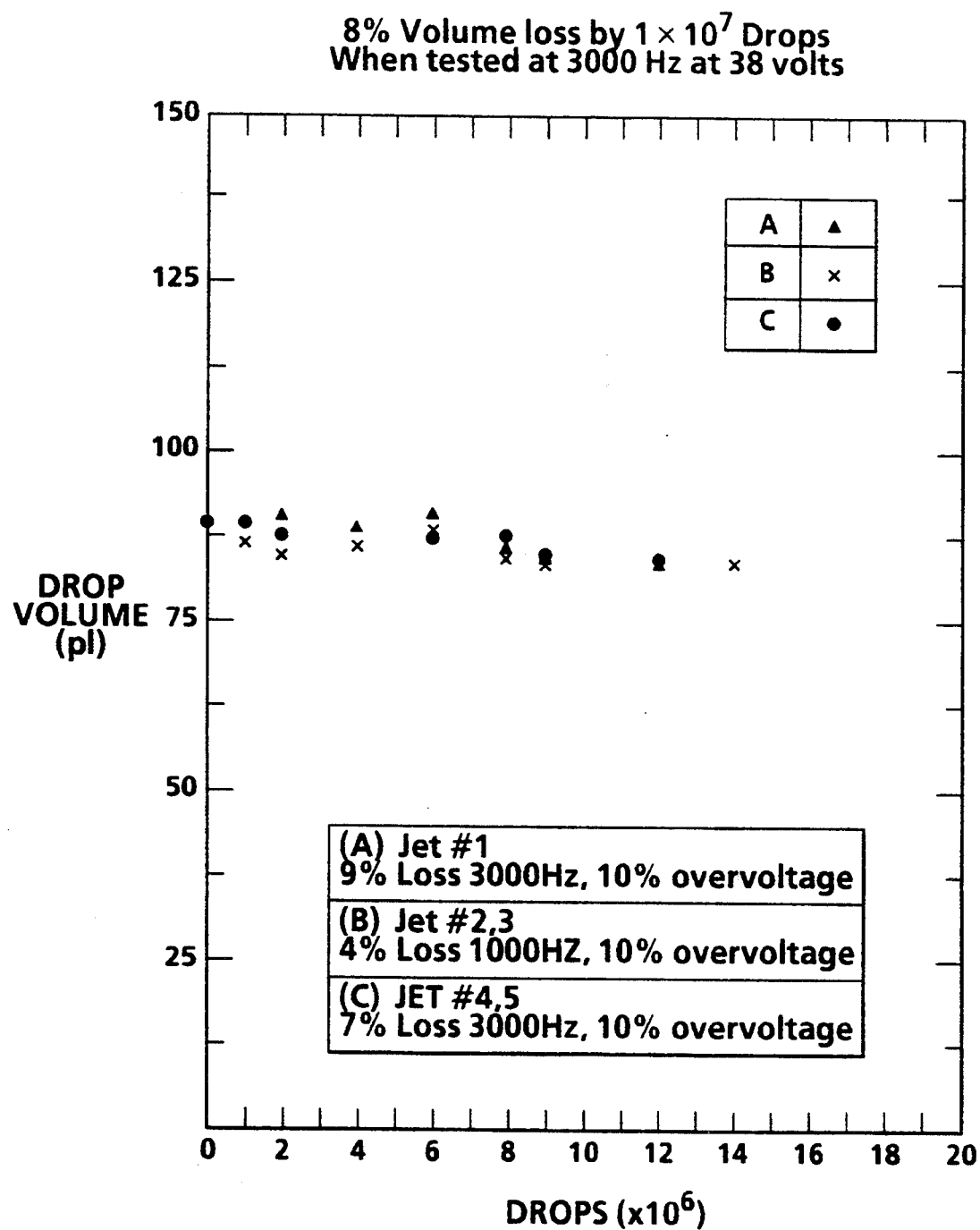
FIG. 3 shows the decrease in drop volume with respect to the number of drops ejected of a printhead under different experimental conditions and for different jet selection.

An ink composition was prepared with the following contents by heating and stirring the ingredients for two hours at 50° followed by cooling to room temperature and filtering through a disposable 0.45 micron cellulose acetate filter (obtained from Nalga Co., Rochester, N.Y.): 2.5 percent by weight Direct Black 168 dye, Lot DG-55 (obtained from Hoechst, Willowdale, Ontario), 20.0 percent by weight ethylene glycol, 3.0 percent by weight tris[2-(2-methoxy-ethoxy)ethyl] amine (TDA-1), obtained from Aldrich Chemical Co., Milwaukee, Wis., 0.03 percent by weight of a polyethylene oxide/bisphenol-A polymer with a molecular weight of 18,500, obtained from Polysciences, Warrington, Pa., and 76.47 percent by weight deionized water. The jetting performance of this ink was evaluated in a test fixture which monitors at specific intervals the drop volume generated by an ink jet printhead upon firing in excess of $10^7$ drops. A drop volume loss of about 8 percent was measured by $1 \times 10^7$ drops when the ink was tested at 3000 Hz and at 10 percent over the threshold voltage necessary for the drop to be ejected from the printhead. A 4 percent drop volume loss was measured by $1 \times 10^7$ drops when the ink was tested at 1000 Hz and at 10 percent over the threshold voltage necessary for the drop to be ejected from the printhead. FIG. 3 shows the decrease in drop volume with respect to the number of drops ejected of a printhead under different experimental conditions and for different jet selection. The data indicate minimum kogation.

EXAMPLE IV

An ink composition is prepared as described in Example III with the exception that tris[2-(2-methoxy-ethoxy)ethyl] amine is replaced with tris[3,6-dioxaoctyl] amine, of the formula $N[CH_2CH_2OCH_2CH_2OC_2H_5]_3$, prepared as described in Example 1 of U.S. Pat. No. 4,408,075, the disclosure of which is incorporated herein by reference. It is believed that results will be obtained which are similar to those obtained in Example III.

EXAMPLE V

An ink composition is prepared as described in Example III with the exception that tris[2-(2-methoxy-ethoxy)ethyl] amine is replaced with tris[3,6,9-trioxa-undecyl] amine, of the formula $N[CH_2CH_2OCH_2CH_2OCH_2CH_2OC_2H_5]_3$, prepared as described in Example 2 of U.S. Pat. No. 4,408,075, the disclosure of which is incorporated herein by reference. It is believed that results will be obtained which are similar to those obtained in Example III.

EXAMPLE VI

An ink composition is prepared as described in Example III with the exception that tris[2-(2-methoxy-ethoxy)ethyl] amine is replaced with tris[3,6-dioxa-heptyl] amine, of the formula $N[CH_2CH_2OCH_2CH_2OCH_3]_3$, prepared as described in Example 3 of U.S. Pat. No. 4,408,075, the disclosure of which is incorporated herein by reference. It is believed that results will be obtained which are similar to those obtained in Example III.

EXAMPLE VII

An ink composition is prepared as described in Example III with the exception that tris[2-(2-methoxy-ethoxy)ethyl] amine is replaced with tris[3,6-dioxa-decyl] amine, of the formula $N[CH_2CH_2OCH_2CH_2OC_4H_9]_3$, prepared as described in Example 4 of U.S. Pat. No. 4,408,075, the disclosure of which is incorporated herein by reference. It is believed that results will be obtained which are similar to those obtained in Example III.

Other embodiments and modifications of the present invention may occur to those skilled in the art subsequent to a review of the information presented herein; these embodiments and modifications, as well as equivalents thereof, are also included within the scope of this invention.

What is claimed is:

1. An ink composition which comprises water, a colorant, and an additive compound of the formula

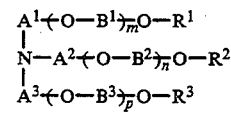

wherein $A^1$, $A^2$, $A^3$, $B^1$, $B^2$, and $B^3$ each, independently of each other, are linear alkenyl groups, $A^1$, $A^2$, $A^3$, $B^1$, $B^2$, and $B^3$ each, independently of each other, are either unsubstituted or substituted with alkyl groups, m, n, and p each, independently of each other, are integers of from 0 to about 10, and $R^1$, $R^2$, and $R^3$ each, independently of each other, are hydrogen, alkyl groups, cycioalkyl groups, phenyl groups, or alkylphenyl groups.

2. An ink composition according to claim 1 wherein the ink also contains a water miscible organic component.

3. An ink composition according to claim 1 wherein the colorant is a dye.

4. An ink composition according to claim 3 wherein the dye is present in an amount of from about 0.5 to about 15 percent by weight of the ink.

5. An ink composition according to claim 1 wherein the colorant is a pigment.

6. An ink composition according to claim 1 wherein the additive compound is present in an amount of at least about 1 percent by weight.

7. An ink composition according to claim 1 wherein the additive compound is present in an amount of from about 1 to about 10 percent by weight of the ink.

8. An ink composition according to claim 1 wherein the additive compound is present in an amount of at least about 3 percent by weight.

9. An ink composition according to claim 1 wherein the additive compound is present in an amount of from about 3 to about 6 percent by weight of the ink.

10. An ink composition according to claim 1 wherein $A^1$, $A^2$, $A^3$, $B^1$, $B^2$, and $B^3$ each, independently of each other, are linear alkenyl groups with from about 2 to about 3 carbon atoms, the alkyl substituents on $A^1$, $A^2$, $A^3$, $B^1$, $B^2$, and $B^3$ each, independently of each other, have from 1 to about 4 carbon atoms, and $R^1$, $R^2$, and $R^3$ each, independently of each other, are hydrogen, alkyl groups with from 1 to about 24 carbon atoms, cycloalkyl groups with from 1 to about 12 carbon atoms, phenyl groups, or alkylphenyl groups wherein the alkyl group contains from 1 to about 12 carbon atoms.

11. An ink composition according to claim 1 wherein the additive compound is of the formula

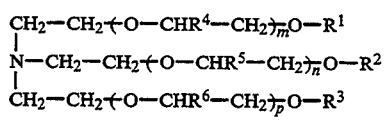

wherein $R^1$, $R^2$, and $R^3$ each, independently of each other, are hydrogen or alkyl groups with from 1 to about 4 carbon atoms, $R^4$, $R^5$, and $R^6$ each, independently of each other, are hydrogen or alkyl groups with 1 or 2 carbon atoms, and m, n, and p each, independently of each other, are integers of from 1 to about 5.

12. An ink composition according to claim 1 wherein the additive compound is tris[2-(2-methoxy-ethoxy)ethyl]amine.

13. An ink composition according to claim 1 wherein the ink also contains a polymeric additive of the formula

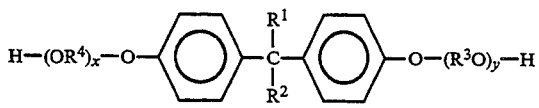

wherein $R^1$ and $R^2$ are each, independent of the other, hydrogen, alkyl groups with from 1 to about 8 carbon atoms, or alkoxy groups with from 1 to about 8 carbon atoms, $R^3$ and $R^4$ are each, independent of the other, alkyl groups with from 1 to about 4 carbon atoms, and x and y are each, independent of the other, a number of from about 100 to about 400.

14. In a process which comprises incorporating into an ink jet printing apparatus an ink composition and causing droplets of the ink composition to be ejected in an imagewise pattern onto a recording sheet, the improvement comprising selecting an ink composition according to claim 1.

15. In a process which comprises incorporating into an ink jet printing apparatus an ink composition and causing droplets of the ink composition to be ejected in an imagewise pattern onto a recording sheet, wherein the ink is selectively heated in an imagewise pattern, thereby causing droplets of the ink to be ejected in an imagewise pattern, the improvement comprising selecting an ink composition according to claim 1.

16. A process which comprises incorporating into an ink jet printing apparatus an ink composition according to claim 1 and causing droplets of the ink composition to be ejected in an imagewise pattern onto a recording sheet.

17. A process according to claim 16 wherein the ink is selectively heated in an imagewise pattern, thereby causing droplets of the ink to be ejected in an imagewise pattern.

* * * * *